United States Patent
Chung et al.

(10) Patent No.: US 9,421,649 B2
(45) Date of Patent: Aug. 23, 2016

(54) AUTOMATIC LOCKING SCREW MACHINE

(71) Applicant: INDUSTRIAL TECHNOLOGY RESEARCH INSTITUTE, Hsinchu County (TW)

(72) Inventors: Hsiang-Nien Chung, Hsinchu (TW); Tung-Chuan Wu, Hsinchu (TW); Tzu-Hsin Kuo, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 544 days.

(21) Appl. No.: 13/774,461

(22) Filed: Feb. 22, 2013

(65) Prior Publication Data

US 2014/0116209 A1 May 1, 2014

(30) Foreign Application Priority Data

Oct. 26, 2012 (TW) .............................. 101139641 A (51) Int. Cl.
*B25B 23/04* (2006.01)
*B25B 23/06* (2006.01)
(Continued)

(52) U.S. Cl.
CPC ............. *B23P 19/002* (2013.01); *B23P 19/003* (2013.01); *B23P 19/004* (2013.01); *B23P 19/005* (2013.01); *B23P 19/006* (2013.01); *B23P 19/06* (2013.01)

(58) Field of Classification Search
CPC ...... B23P 19/06; B23P 19/006; B23P 19/003; B23P 19/004; B23P 19/005; B23P 19/002
USPC .................... 81/430; 221/263–265, 277, 278; 227/117–119
See application file for complete search history.

(56) References Cited

U.S. PATENT DOCUMENTS 2,244,048 A * 6/1941 Butter ...................... B21J 5/025
227/149
2,523,278 A * 9/1950 Carl, Jr. ................. B21K 1/025
193/46
(Continued)

FOREIGN PATENT DOCUMENTS

CN 2510447 Y 9/2002
CN 2813219 Y 9/2006
(Continued)

OTHER PUBLICATIONS

Dhayagude et al., "Fuzzy logic control of automated screw fastening", Robotics and Computer-Integrated Manufacturing, vol. 12, No. 3, pp. 235-242, 1996.
(Continued)

*Primary Examiner* — Bryan R Muller
(74) *Attorney, Agent, or Firm* — Rabin & Berdo, P.C.

(57) ABSTRACT

The present disclosure provides an automatic locking screw machine, which includes an automatic separating module, an automatic feeding module, and an automatic locking module. The automatic separating module separates a plurality of screws arranged in an array. The automatic feeding module is connected to the automatic separating module, and includes a feeding duct for conveying the screws separated by the automatic separating module. The automatic locking module is connected to the automatic feeding module, and includes a first spring ball mechanism and a screwdriver. The first spring ball mechanism supports the screws conveyed by the feeding duct, and the screwdriver locks the screws supported by the first spring ball mechanism onto a workpiece.

16 Claims, 12 Drawing Sheets

(51) Int. Cl.
*B65H 3/00* (2006.01)
*B25C 5/06* (2006.01)
*B25B 5/02* (2006.01)
*B23P 19/00* (2006.01)
*B23P 19/06* (2006.01)

(56) References Cited

U.S. PATENT DOCUMENTS

| | | | | |
|---|---|---|---|---|
| 3,317,990 | A | * 5/1967 | Amtsberg | B23P 19/004 29/240 |
| 3,466,730 | A | * 9/1969 | Amtsberg | B23P 19/003 29/240 |
| 3,494,393 | A | * 2/1970 | Casanov | B23P 19/006 221/212 |
| 5,365,810 | A | 11/1994 | Inaniwa et al. | |
| 5,813,114 | A | * 9/1998 | Blacket | B21J 15/32 227/119 |
| 6,330,841 | B1 | * 12/2001 | Baumgartner | B23P 19/006 81/451 |
| 2011/0209589 | A1 | * 9/2011 | Ota | B23P 19/003 81/430 |
| 2012/0048067 | A1 | 3/2012 | Ranta | |
| 2013/0223956 | A1 | * 8/2013 | Gostylla | B21J 15/025 411/501 |

FOREIGN PATENT DOCUMENTS

| | | | |
|---|---|---|---|
| CN | 201098868 | Y | 8/2008 |
| CN | 201389820 | Y | 1/2010 |
| CN | 101693361 | A | 4/2010 |
| CN | 101704232 | A | 5/2010 |
| CN | 201529963 | U | 7/2010 |
| CN | 201776726 | U | 3/2011 |
| CN | 202318158 | U | 7/2012 |
| JP | 1993026231 | U | 4/1993 |
| JP | H05-26231 | U | 4/1993 |
| JP | 1993338786 | A | 12/1993 |
| JP | 2006016173 | A | 1/2006 |
| JP | 2006016173 | A * 1/2006 | ............... B23P 19/00 |
| JP | 2010142900 | A | 7/2010 |
| TW | 237734 | | 1/1995 |
| TW | 516482 | U | 1/2003 |
| TW | I341227 | A | 1/2009 |
| WO | WO-9642127 | A1 | 12/1996 |
| WO | WO-9816352 | A1 | 4/1998 |

OTHER PUBLICATIONS

Malek et al., "Multivariable effects on an automatic screw-torquing process", Journal of Manufacturing Systems, vol. 12, No. 6, pp. 457-462, 1993.

Huang, "Design and Manufacture of a New detachable anti-overload Clutch for Electric Screwdrivers", National Cheng Kung University, pp. 1-9; 2000.

Pitipon S. et al., "An automated four-DOF robot screw fastening using visual servo", System Integration (SII), 2010 IEEE/SICE International Symposium, pp. 379-383, 2010.

Sukikhom et al., "Effects of Screw Fastening Sequence to Top Cover Loosening in Hard Disk Drive Assembly", Applied Mechanics and Materials, pp. 3534-3540, 2011.

Yu et al., "Design of Screw Fastening Machine Control System", Machine Tool & Hydraulics, pp. 1-2, 2009.

* cited by examiner

AUTOMATIC LOCKING SCREW MACHINE

CROSS-REFERENCE TO RELATED APPLICATIONS

This application claims priority to Taiwanese Patent Application No. 101139641, filed on Oct. 26, 2012. The entirety of the above-mentioned patent application is hereby incorporated by reference herein and made a part of this specification.

TECHNICAL FIELD

The present disclosure relates to locking screw machines, and more particularly, to automatic locking screw machines.

BACKGROUND

In many manufacturing industries, the joining and the securing of components are formed by locking screws. Screws thus play an indispensable role, are widely used in various fields and have a huge market potential.

Traditionally, while locking a screw to a workpiece, a user holds the screw in one hand and operates an electric screwdriver or a pneumatic screwdriver in the other hand. The traditional operation is quite time-consuming and laborious. In order to overcome the inconvenience resulting from the manual locking of screws, automatic locking screw machines are developed.

Screws may be fed in an automatic locking screw machine via air blowing or attraction. In general, since the air blowing method works continuously, the work head of the automatic locking screw machine does not need to move back and forth for every locking of screws. Hence, the air blowing type of the automatic locking screw machine has better efficiency than the attraction type of the automatic locking screw machine. However, the air blowing type of the automatic locking screw machine is limited by the shapes and the length-to-diameter ratios of the screws, and is thus not suitable for all kinds of screws. This is exemplified in the following descriptions.

Figure 1A:
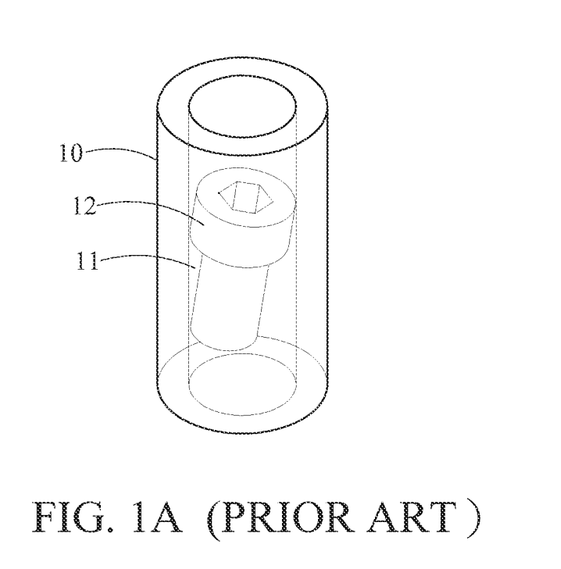
FIG. 1A is a perspective diagram schematically illustrating a feeding duct and a screw suitable to be delivered by air blowing in the prior art.
Figure 1B:
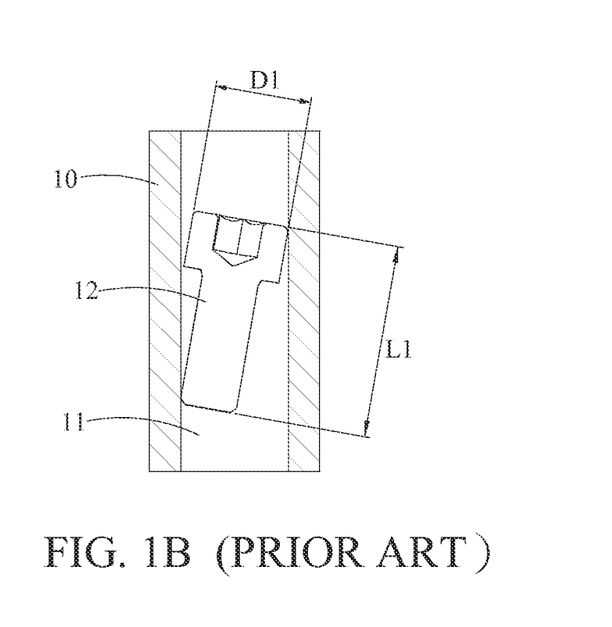
FIG. 1B is a diagram schematically illustrating the planar view of the feeding duct and the screw shown in FIG. 1A.

FIG. 1A is a perspective diagram schematically illustrating a feeding duct and a screw suitable to be delivered via air blowing in the prior art, and FIG. 1B is a diagram schematically showing a planar view of the feeding duct and the screw suitable to be delivered by air blowing in the prior art shown in FIG. 1A.

As shown in FIG. 1A and FIG. 1B, a screw 12 is conveyed through a passage 11 of a feeding duct 10 to a work head of an automatic locking screw machine (not shown) by air pressure. Since the length L1 of the screw 12 is greater than the diameter D1 of the passage 11, the screw 12 will not flip or get stuck in the passage 11 of the feeding duct 10.

Figure 2A:
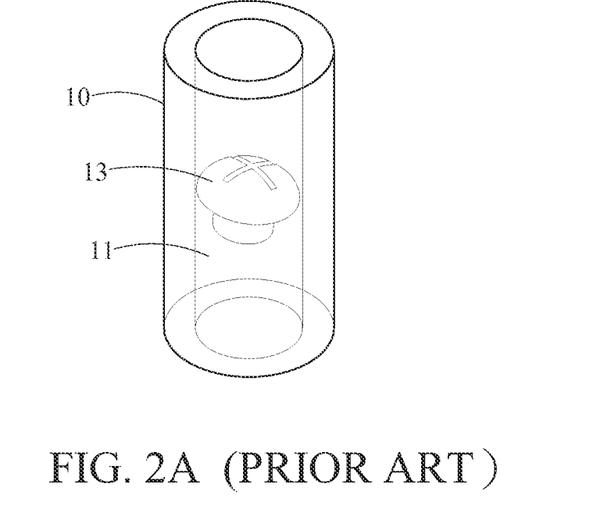
FIG. 2A is a perspective diagram schematically illustrating a feeding duct and a screw which is not suitable to be delivered by air blowing in the prior art.
Figure 2B:
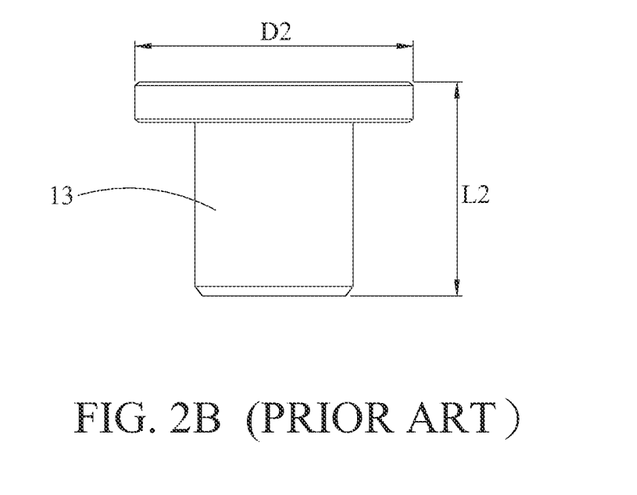
FIG. 2B is a diagram schematically illustrating the planar view of the screw shown in FIG. 2A.

FIG. 2A is a perspective diagram schematically illustrating a feeding duct and a screw, which is not suitable to be delivered by air blowing in the prior art, and FIG. 2B is a diagram schematically illustrating a planar view of a screw shown in FIG. 2A.

As shown in FIG. 2A and FIG. 2B, the length L2 of a screw 13 is less than the diameter D2 of the passage, such that the screw 13 would flip or be stuck in the passage 11 of the feeding duct 10. The screw 13 is thus not suitable to be conveyed via air-blow feeding.

Therefore, there is a need to develop a device in order to overcome the above-mentioned drawbacks in the prior art.

SUMMARY

The present disclosure provides an automatic locking screw machine. A rotating plate is provided to separate a plurality of screws arranged in an array, and a feeding duct with a T-shaped passage is used to sequentially convey the separated screws. The screws conveyed in the feeding duct are supported by a spring ball mechanism, and the conveyed screws are then locked onto a workpiece. As a result, the present disclosure eliminates the problems in the prior art that the screws flip or get stuck in a feeding duct or a through hole of a work head due to the less length of the screws. In other words, the present disclosure provides an automatic locking screw machine with a highly automated process and high production efficiency.

The present disclosure provides an automatic locking screw machine including an automatic separating module, an automatic feeding module, and an automatic locking module. The automatic separating module separates a plurality of screws arranged in an array. The automatic feeding module is connected to the automatic separating module, and includes a feeding duct for conveying the screws separated by the automatic separating module. The automatic locking module is connected to the automatic feeding module, and includes a first spring ball mechanism and a screwdriver. The screws conveyed by the feeding duct are supported by the first spring ball mechanism, and locked onto a workpiece by the screwdriver.

BRIEF DESCRIPTION OF DRAWINGS

The present disclosure can be more fully understood by reading the following detailed description of the preferred embodiments, with reference made to the accompanying drawings, wherein.

DETAILED DESCRIPTION OF THE EMBODIMENTS

In the following detailed description, for purposes of explanation, numerous specific details are set forth in order to provide a through understanding of the disclosed embodiments. It will be apparent, however, that one or more embodiments may be practiced without these specific details. In other instances, well-known structures and devices are schematically shown in order to simplify the drawing.

Figure 3:
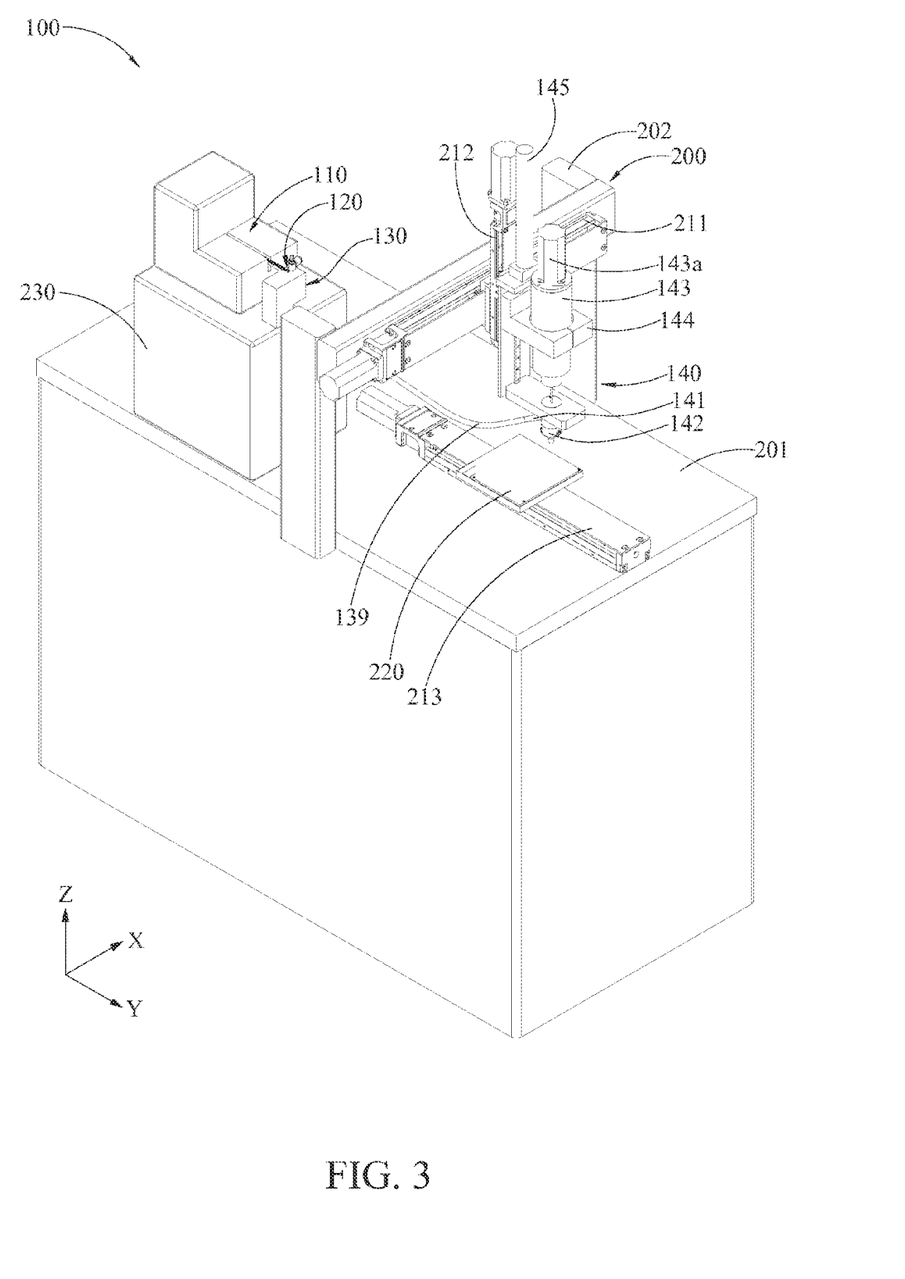
FIG. 3 is a perspective diagram schematically depicting an automatic locking screw machine in accordance with the present disclosure.

FIG. 3 is a perspective diagram schematically depicting an automatic locking screw machine in accordance with the present disclosure.

An automatic locking screw machine 100 is disposed on a platform 201 of a triaxial platform 200. The automatic locking screw machine 100 includes an automatic arraying module 110, an automatic separating module 120, an automatic feeding module 130, and an automatic locking module 140.

The automatic arraying module 110 is disposed on a carrier 230 for arranging a plurality of screws (not shown) into an array. The automatic arraying module 110 may adopt a vibration plate sorting mechanism or a rocker arm arraying mechanism for arranging the screws.

The automatic separating module 120 is connected to the automatic arraying module 110 for separating the plurality of arrayed screws one by one.

The automatic feeding module 130 is connected to the automatic separating module 120, and includes a feeding duct 139 for conveying the screws separated by the automatic separating module 120.

The automatic locking module 140 is connected to the automatic feeding module 130, and is disposed on the triaxial platform 200 or a mechanical arm. The triaxial platform 200 includes a supporting frame 202, a first slide rail 211, a second slide rail 212 and a third slide rail 213. The first slide rail 211 is provided on the support frame 202 for the automatic locking module 140 to move in a horizontal direction (e.g. in the X-axis direction). The second slide rail 212 is disposed on the first slide rail 211 for the automatic locking module 140 to move in a vertical direction (e.g. in the Z-axis direction). The third slide rail 213 is disposed on the platform 201 for a workpiece 220 to move backwards or forwards (e.g. in the Y-axis direction). In this way, the positions of the automatic locking module 140 and the workpiece 220 can be adjusted by the triaxial platform 200.

The automatic locking module 140 includes a second duct 141, a work head 142, a screwdriver 143, an electric device 143a, a screwdriver base 144, and a pneumatic cylinder 145. The two ends of the second duct 141 are respectively connected to the feeding duct 139 and the work head 142. The work head 142 has a first spring ball mechanism (not shown) for supporting the screws conveyed by the feeding duct 139. The end portion of the work head 142 is used for supporting the workpiece 220.

The screwdriver 143 can be a pneumatic screwdriver or an electric screwdriver, and be rotated by the electric device 143a (such as an electric motor) or a pneumatic device so as to lock a screw supported by the first spring ball mechanism onto the workpiece 220 or in a groove. The screwdriver base 144 is used for holding the screwdriver 143 therein. The pneumatic cylinder 145 is connected to the screwdriver base 144 for generating air pressure to provide force to the automatic locking module 140, such that the screwdriver base 144 and the screwdriver 143 can be actuated. FIGS. 4A to 4D are perspective diagrams schematically illustrating the operations of the automatic arraying module 110, the automatic separating module 120, and the automatic feeding module 130 in accordance with the present disclosure.

Figure 4A:
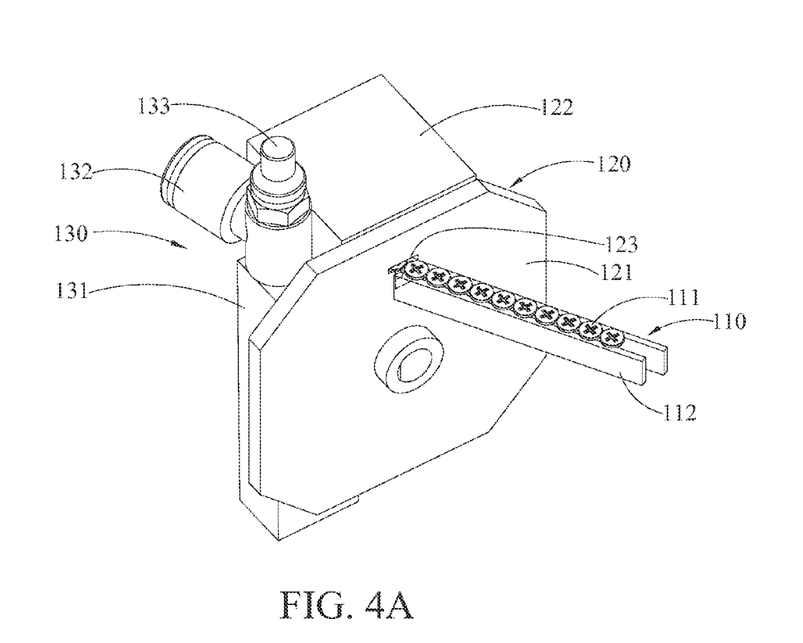
FIGS. 4A to 4D are perspective diagrams schematically illustrating the operations of an automatic arraying module, an automatic separating module, and an automatic feeding module in accordance with the present disclosure.

As shown in FIG. 4A, the automatic arraying module 110 includes a bearing member 112 for carrying screws 111, which are arranged into an array. The automatic separating module 120 includes a rotating plate 121 and a rotating unit 122. The rotating plate 121 has a first opening 123. The first opening 123 may be an inclined hole. The rotating unit 122 may be a motor, a rotating cylinder, or other similar mechanisms, and is responsible for rotating the rotating plate 121. The automatic feeding module 130 includes an air pressure conduit 131, an air pressure fitting 132, and an air pressure regulating valve 133.

The automatic arraying module 110 pushes the arrayed screws 111 towards the automatic separating module 120 by vibration or thrust, so that the screws 111 enter the first opening 123 of the automatic separating module 120 one by one.

Figure 4B:
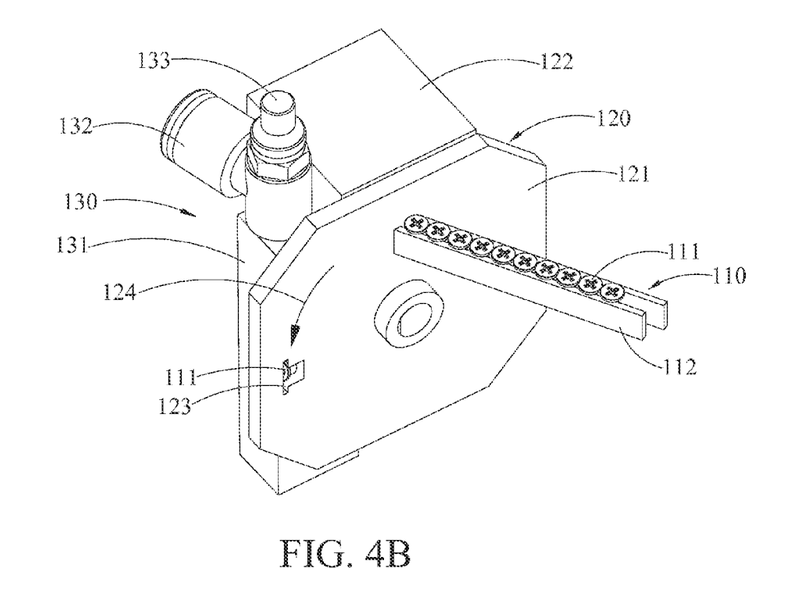

As shown in FIG. 4B, the rotating plate 121 is rotated by the rotating unit 122, such that the first opening 123 and the screw 111 therein are moved to a predetermined position. In the present embodiment, the rotating plate 121 is rotated by the rotating unit 122 in a first direction 124, and thus the first opening 123 and the screw 111 therein are moved to the air pressure conduit 131.

Figure 4C:
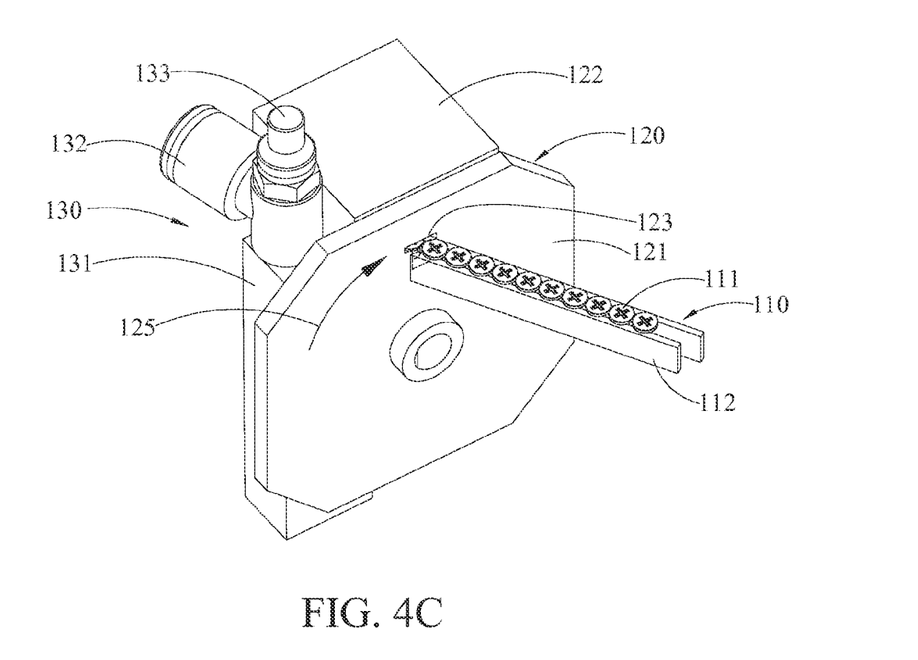
Figure 4D:
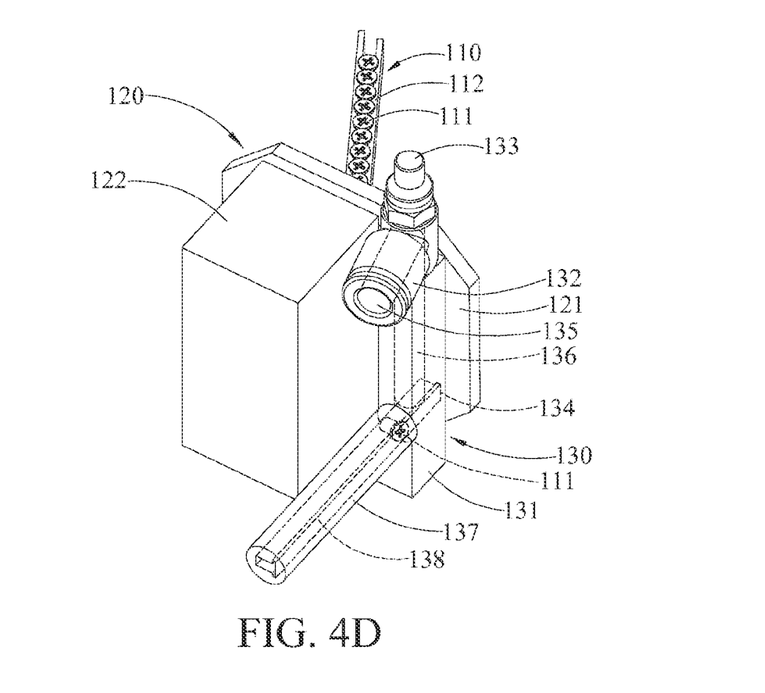

As shown in FIGS. 4C to 4D, the air pressure conduit 131 includes a second opening 134 and an air pressure pipe 136. The pressure fittings 132 includes a blowing aperture 135 connected to an external pneumatic device (not shown) for obtaining air pressure. The air pressure regulating valve 133 is connected to the air pressure conduit 131 and the air pressure fittings 132 for regulating the magnitude of the air pressure.

The automatic feeding module 130 further has a first duct 137, and the two ends of the first duct 137 are respectively connected to the air pressure conduit 131 and the feeding duct (not shown). The first duct 137 includes a first connecting pipe 138 with a T-shaped cross-section.

The first opening 123 and the screw 111 therein shown in FIG. 4B are moved to the second opening 134 of the air pressure conduit 131. The first opening 123 is inclined, and thus the screw 111 therein rolls into the second opening 134.

Next, the rotating plate 121 is rotated by the rotating unit 122 in the reverse direction (i.e. a second rotational direction 125) such that the first opening 123 is moved back to its original position. At the same time, the rotating plate 121 seals the second opening 134 to avoid leakage of the air.

Subsequently, air pressure enters the second opening 134 and the air pressure pipe 136 through the blowing aperture 135 of the air pressure fittings 132. Since the air pressure pipe 136 and the second opening 134 are in communication with each other, the screw 111 inside the second opening 134 is then transferred into the automatic locking module (not shown) through the first connecting pipe 138 of the first duct 137 and the pipe of the feeding duct.

Figure 5A:
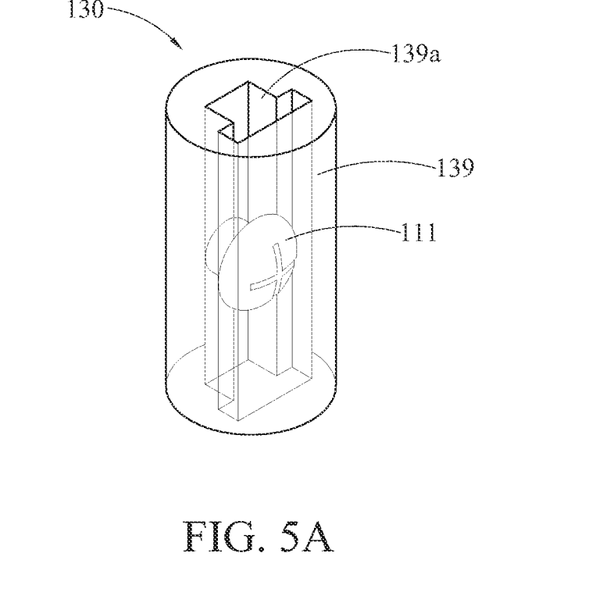
FIGS. 5A and 5B are perspective diagrams schematically illustrating a feeding duct and a screw conveyed in the automatic feeding module in accordance with the present disclosure.
Figure 5B:
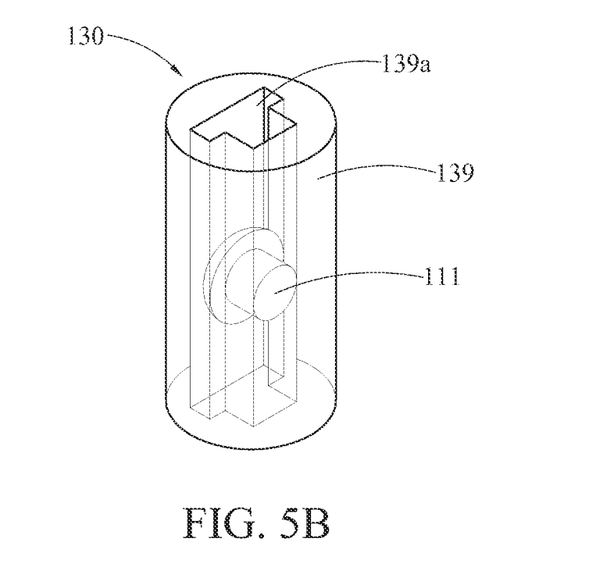

FIGS. 5A and 5B are perspective diagrams schematically illustrating different views of the feeding duct and a screw conveyed in the automatic feeding module in accordance with the present disclosure.

As shown, the feeding duct 139 can be a flexible tube, and the first duct 137 and the second duct 141 shown in FIG. 4D and FIG. 3 can be rigid ducts in order to facilitate both ends of the feeding duct 139 to be easily connected to the first duct 137 and the second duct 141. The length of the screw 111 is less than the diameter of the feeding duct 139, but in other embodiments, the length of the screw 111 may be greater than the diameter of the feeding duct 139.

The screw 111 is T-shaped, and so is the cross section of a passage 139a of the feeding duct 139. Consequently, the screw 111 is smoothly conveyed through the feeding duct 139 to the work head of the automatic locking module (not shown). It is thus avoided that the screw 111 flips or get stuck in the feeding duct 139 during transportation to the work head due to the relatively shorter length of the screw 111.

Figure 6A:
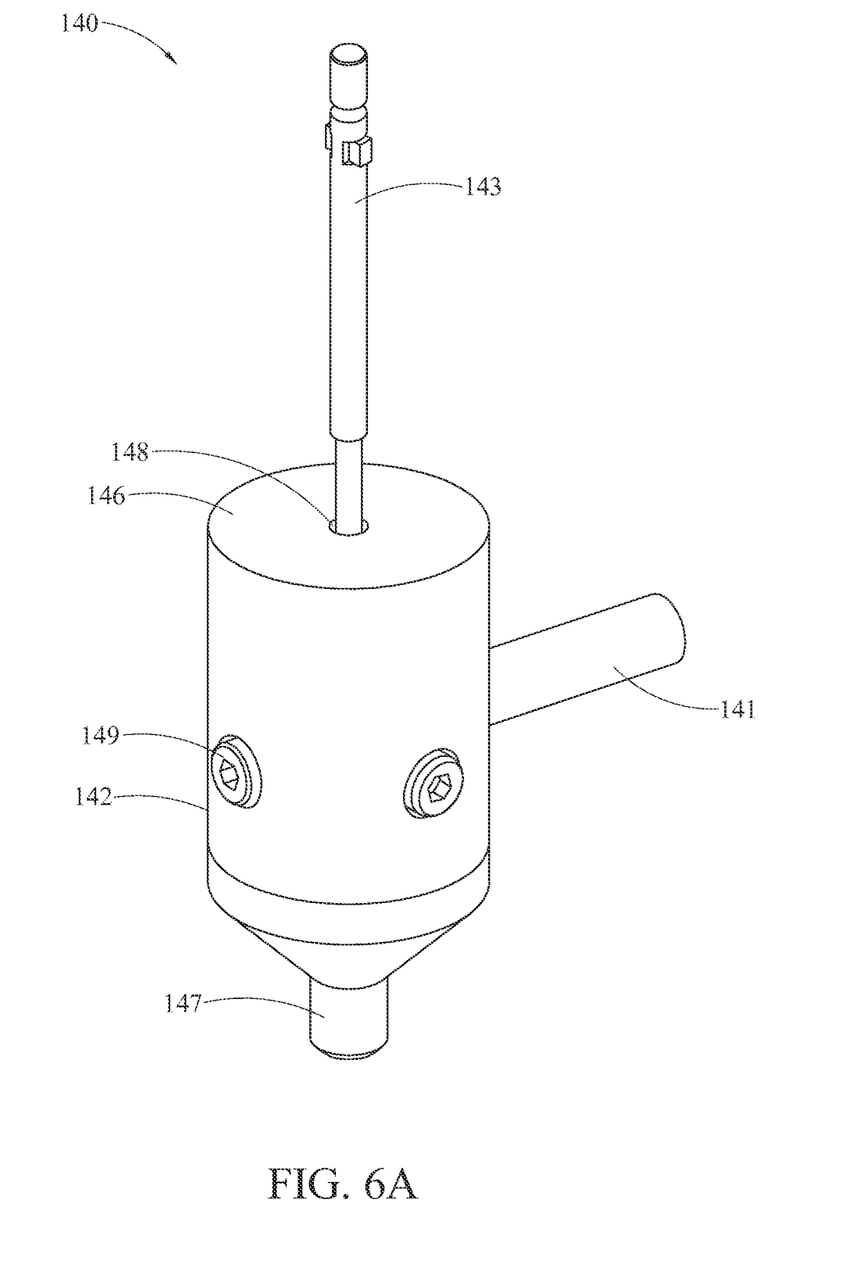
FIG. 6A is a perspective diagram schematically illustrating a first type of a work head and a spring ball mechanism in the automatic locking module in accordance with the present disclosure.
Figure 6B:
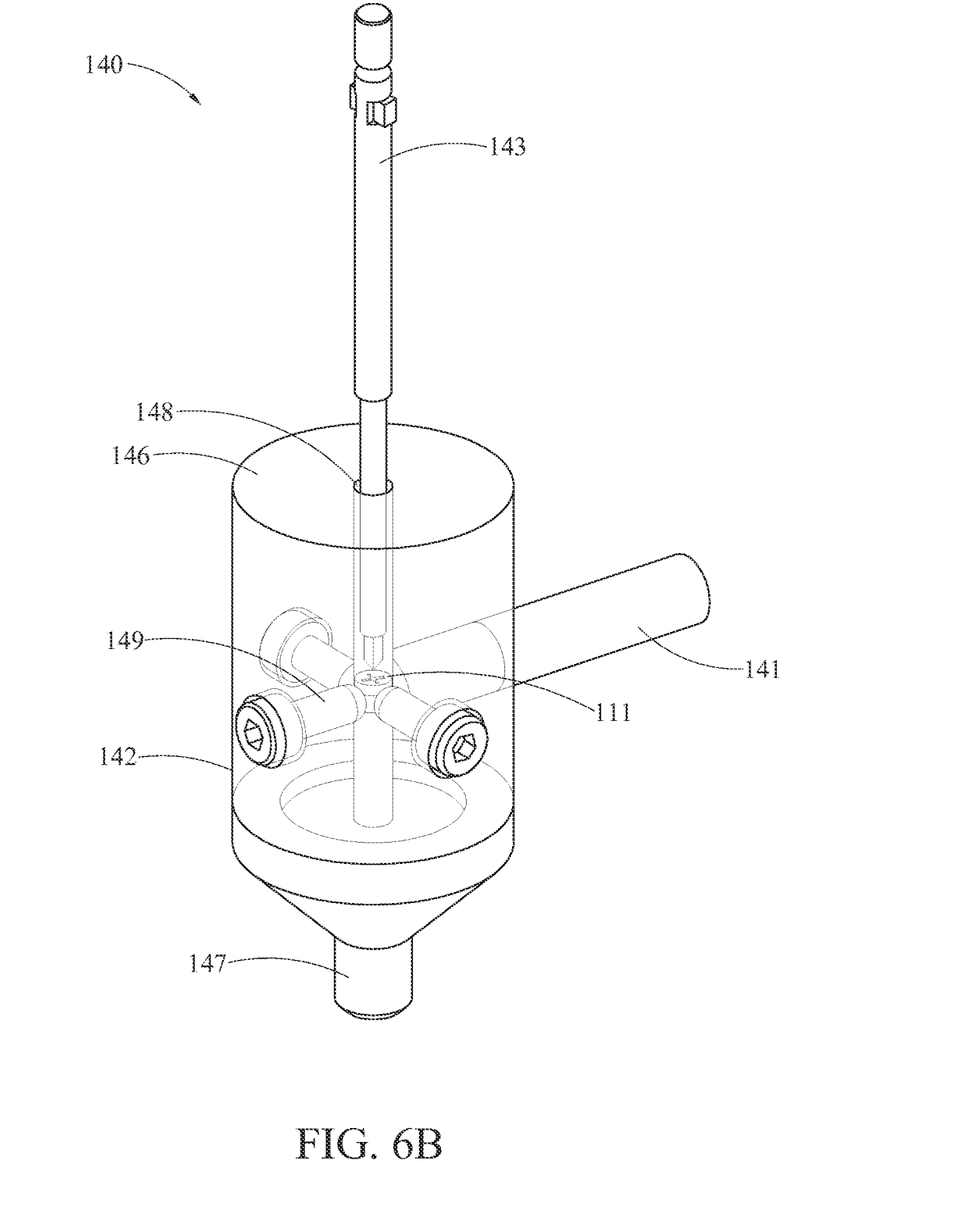
FIG. 6B is a perspective diagram schematically illustrating another view of the work head and the spring ball mechanism in the automatic locking module of FIG. 6A in accordance with the present disclosure.
Figure 6C:
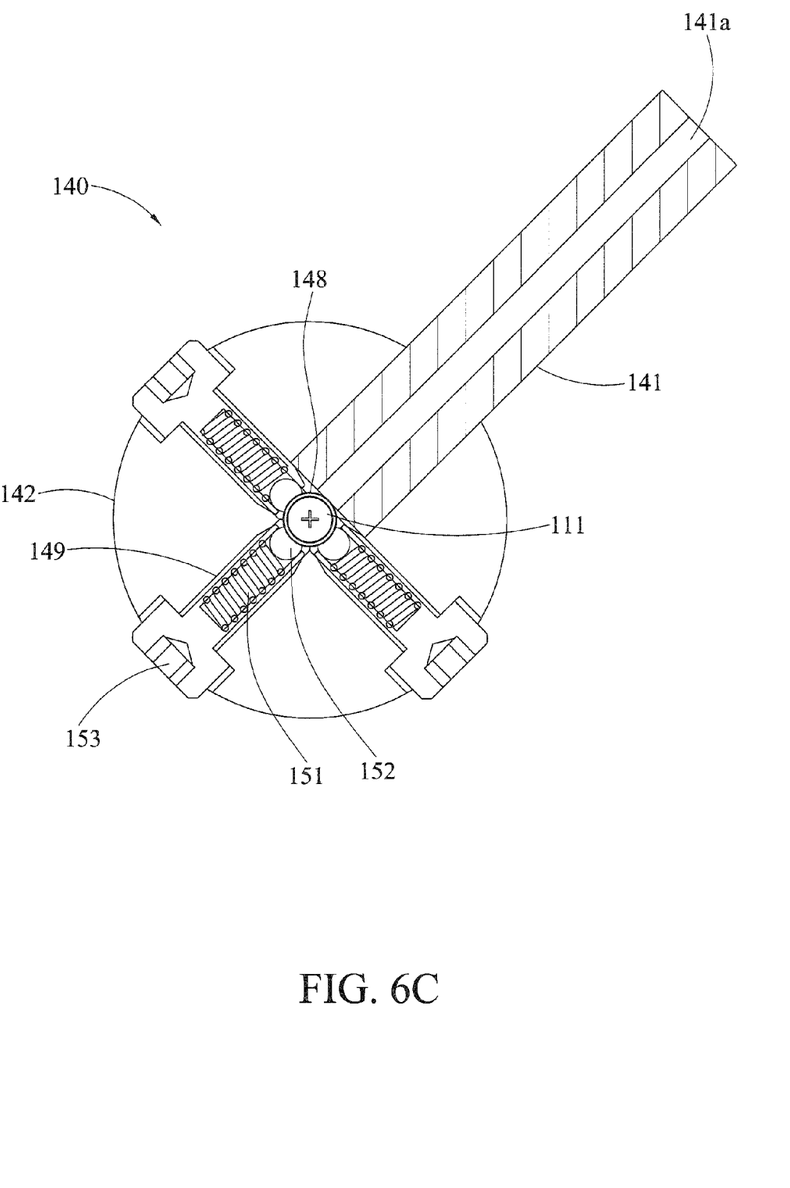
FIG. 6C is a cross-sectional diagram schematically illustrating the work head and the spring ball mechanism in the automatic locking module of FIG. 6A in accordance with the present disclosure.

FIG. 6A is a perspective diagram schematically illustrating a first type of work head and the spring ball mechanism in the automatic locking module in accordance with the present disclosure. FIG. 6B is a perspective diagram schematically illustrating another view of the work head and the spring ball mechanism in the automatic locking module of FIG. 6A in accordance with the present disclosure. FIG. 6C is a diagram schematically illustrating a cross-sectional view of the work head and the spring ball mechanism in the automatic locking module of FIG. 6A in accordance with the present disclosure.

As shown, the automatic locking module 140 includes the second duct 141, the work head 142, the screwdriver 143, the first spring ball mechanism 149, the screwdriver base 144 and the pneumatic cylinder 145.

The two ends of the second duct 141 are respectively connected to the work head 142 and the feeding duct 139 shown in FIGS. 5A and 5B, and the cross section of a second connecting pipe 141a of the second duct 141 is T-shaped.

The work head 142 includes a body 146, an end portion 147 and a through hole 148. The body 146 is connected to the end portion 147, and the through hole 148 penetrates the body 146 and the end portion 147.

The diameter of the end portion 147 is less than the diameter of the body 146. When the screwdriver 143 is about to lock the attracted screw 111, the end portion 147 may be used for locating, supporting and abutting against a location where the screw 111 is to be locked on the workpiece 220 of FIG. 3 in order to facilitate the locking of the screw 111 into a small recess or groove.

The first spring ball mechanism 149 is disposed within the work head 142, and aligned with the second duct 141. The first spring ball mechanism 149 is composed of three sets of springs 151, three balls 152, and three T-shaped screws 153. The three sets of springs 151 and the second duct 141 are 90 degrees apart. The springs 151 are respectively spiraled onto the T-shaped screws 153 and in contact with the balls 152. The balls 152 are located in the through hole 148 for supporting the screw 111, which are conveyed via the second duct 141 to the through hole 148. The T-shaped screws 153 are used to tighten or relax the springs 151, allowing the balls 152 to be positioned at the desired locations.

The screw 111 conveyed in the feeding duct 139 as shown in FIGS. 5A and 5B is transported to the through hole 148 via the second duct 141 shown in FIGS. 6A and 6C, and the screw 111 is supported in the through hole 148 by the first spring ball mechanism 149.

The screwdriver 143 enters the body 146 and the through hole 148 to attract the screws 111 in the through hole 148, then moves the attracted screw 111 to the end portion 147, and then rotates and tightens the screw 111 onto the workpiece 220 of FIG. 3. The screwdriver 143 and the screw 111 may both be magnetic, allowing the screwdriver 143 to securely attract the screws 111 and prevent the screw 111 from falling off, flipping or being stuck inside the through hole 148.

Figure 7A:
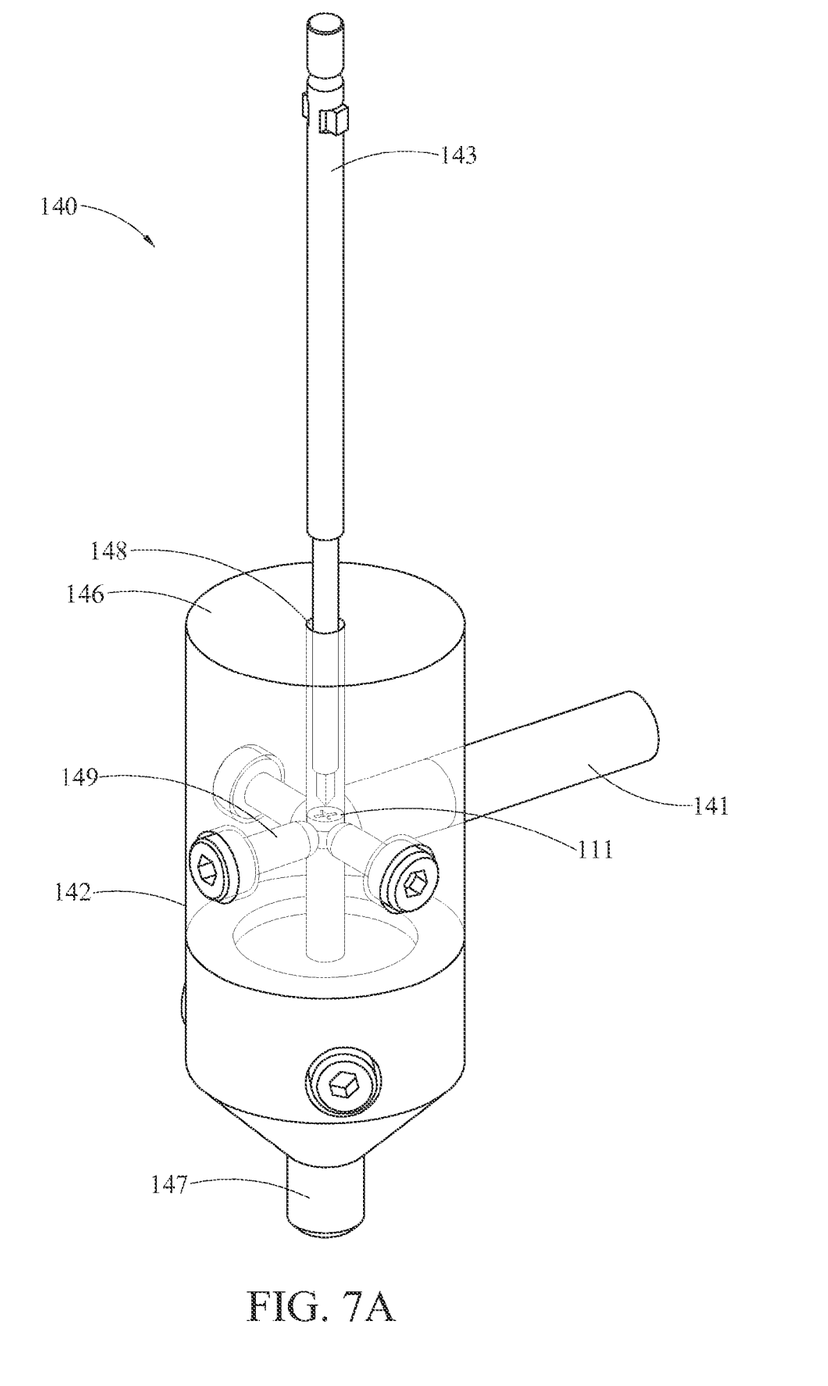
FIG. 7A is a perspective diagram schematically illustrating a second type of a work head and a spring ball mechanism in the automatic locking module in accordance with the present disclosure.
Figure 7B:
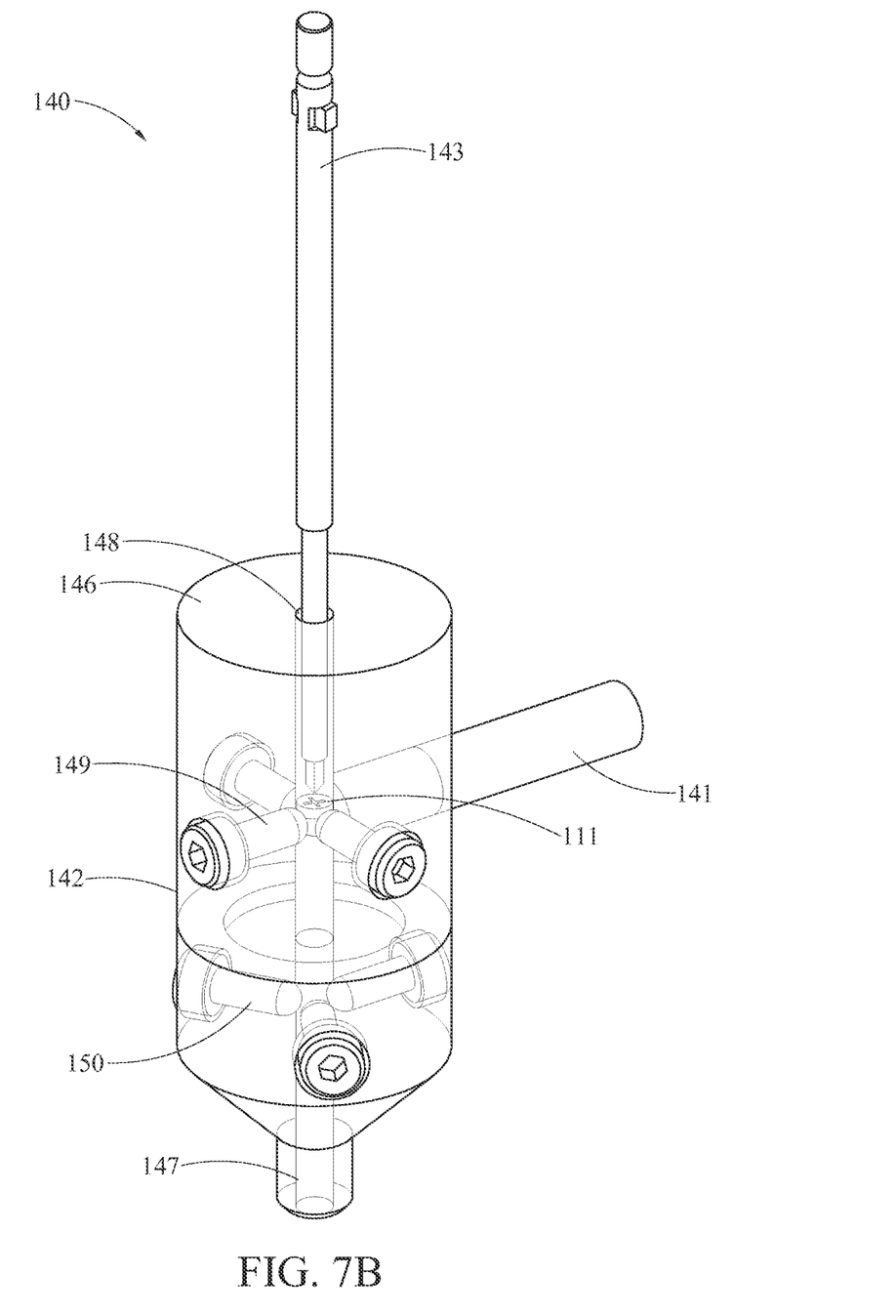
FIG. 7B is perspective diagram schematically illustrating another view of the work head and the spring ball mechanism in the automatic locking module of FIG. 7A in accordance with the present disclosure.
Figure 7C:
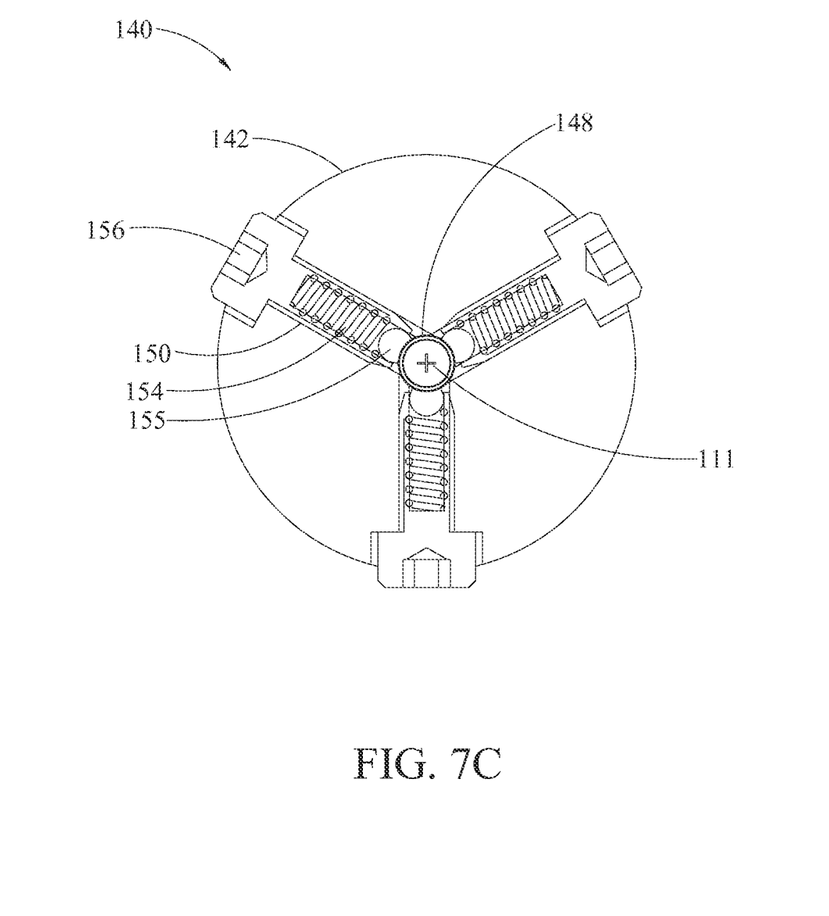
FIG. 7C is a cross-sectional diagram schematically illustrating the work head and the spring ball mechanism in the automatic locking module of FIG. 7A in accordance with the present disclosure.

FIG. 7A is a perspective diagram schematically illustrating a second type of a work head and the spring ball mechanism in the automatic locking module in accordance with the present disclosure. FIG. 7B is a perspective diagram schematically illustrating another view of the work head and the spring ball mechanism in the automatic locking module of FIG. 7A in accordance with the present disclosure. FIG. 7C is a diagram schematically illustrating a cross-sectional view of the work head and the spring ball mechanism in the automatic locking module of FIG. 7A in accordance with the present disclosure.

The elements such as the work head and the spring ball mechanism in FIGS. 7A to 7C are generally similar to those shown in FIGS. 6A to 6C, and thus these common elements will not be repeatedly illustrated herein. The main differences are described as follow.

As shown in FIGS. 7A to 7C, the automatic locking module 140 further includes a second spring ball mechanism 150. The second spring ball mechanism 150 is disposed within the work head 142 for supporting the screws 111 from the first spring ball mechanism 149. Thus, both the first spring ball mechanism 149 and the second spring ball mechanism 150 provide the support of the screws 111, and prevent the screws 111 from falling off, flipping or being stuck inside the through hole 148.

The second spring ball mechanism 150 is composed of three sets of springs 154, three balls 155, and three T-shaped screws 156. The three sets of springs 154 are 120 degrees apart from one another. The springs 154 are respectively spiraled onto the T-shaped screws 156 and in contact with the balls 155. The balls 155 are located in the through hole 148 for supporting the screws 111 from the first spring ball mechanism 149. The T-shaped screws 156 are used to tighten or relax the springs 154, allowing the balls 155 to be positioned at the desired locations.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An automatic locking screw machine, comprising:
an automatic separating module for separating a plurality of screws arranged in an array, wherein the automatic separating module comprises a rotating plate for rotation about a rotational axis and including a first side, a second side opposite to the first side, the first and second sides being substantially perpendicular to the rotational axis, and a first T-shaped opening penetrating the first side and the second side:
an automatic feeding module connected to the automatic separating module, and comprising an air pressure conduit and a feeding duct for conveying the screws separated by the automatic separating module, wherein the air pressure conduit comprises a second T-shaped opening, one of the screws sequentially passing through the first side into the first T-shaped opening in a first position, rotating to a second position, passing through the second side of the rotating plate, and then entering into the second T-shaped opening of the air pressure conduit from the second side: and an automatic locking module connected to the automatic feeding module, and comprising a first spring ball mechanism and a screwdriver, wherein the screws conveyed by the feeding duct are supported by the first spring ball mechanism, and locked on a workpiece by the screwdriver.

2. The automatic locking screw machine of claim 1, wherein the automatic separating module further comprises a rotating unit, the screws enter into the first T-shaped opening of the rotating plate one by one, and then the rotating unit rotates the rotating plate to shift the first T-shaped opening and the one of the screws carried therein to a predetermined location.

3. The automatic locking screw machine of claim 2, wherein when the first T-shaped opening and the one of the screws carried therein are rotated to the second T-shaped opening, the one of the screws is moved into the second T-shaped opening, and then the rotating plate is reversely rotated by the rotating unit for returning the first T-shaped opening back to its original location and for covering the second T-shaped opening.

4. The automatic locking screw machine of claim 3, wherein the automatic feeding module further comprises an air pressure connector connected to an external air pressure device for obtaining air pressure and allowing the air pressure to enter an air pressure pipe of the air pressure conduit and the second T-shaped opening via a blowing aperture of the air pressure connector, so as to convey the one of the screws in the second T-shaped opening into the automatic locking module.

5. The automatic locking screw machine of claim 4, wherein the automatic feeding module further comprises an air pressure modulating valve connected to the air pressure conduit and the air pressure connector for modulating the air pressure.

6. The automatic locking screw machine of claim 3, wherein the automatic feeding module further comprises a first duct having both ends respectively connected to the air pressure conduit and the feeding duct, and the automatic locking module further includes a second duct connected to the feeding duct.

7. The automatic locking screw machine of claim 6, wherein the feeding duct is a flexible tube, and the first and second ducts are rigid ducts.

8. The automatic locking screw machine of claim 6, wherein the first spring ball mechanism comprises three sets of springs, three balls, and three T-shaped screws, and the three sets of springs and the second duct are 90 degrees apart to each other.

9. The automatic locking screw machine of claim 6, wherein a cross section of a first connecting pipe of the first duct, a passage of the feeding duct, or a second connecting pipe of the second duct is T-shaped.

10. The automatic locking screw machine of claim 6, wherein the automatic locking module further comprises a work head, and the first spring ball mechanism is provided in the work head and aligned to the second duct.

11. The automatic locking screw machine of claim 10, wherein the work head comprises a body, an end portion and a through hole, the body is connected to the end portion, a diameter of the end portion is less than a diameter of the body, the through hole penetrates the body and the end portion, and the one of the screws conveyed by the feeding duct is conveyed to the through hole via the second duct, and is supported in the through hole by the first spring ball mechanism.

12. The automatic locking screw machine of claim 11, wherein the screwdriver enters the through hole from the body to attract the one of the screws in the through hole, and moves the one of the screws to the end portion so as to rotate and tighten the one of the screws on the workpiece.

13. The automatic locking screw machine of claim 11, wherein the automatic locking module further comprises a second spring ball mechanism provided in the work head for supporting the screws from the first spring ball mechanism, the second spring ball mechanism includes three sets of springs, three balls, and three T-shaped screws, and the three sets of springs are 120 degrees apart from one another.

14. The automatic locking screw machine of claim 13, wherein the first spring ball mechanism and the second spring ball mechanism support the screws, and prevent the screws from falling off, flipping or being stuck inside the through hole.

15. The automatic locking screw machine of claim 1, wherein the automatic locking module further comprises a screwdriver base for holding the screwdriver therein, and a pneumatic cylinder connected to the screwdriver base for generating air pressure to actuate the automatic locking module for moving the screwdriver base and the screwdriver.

16. The automatic locking screw machine of claim 1, further comprising an automatic arraying module connected to the automatic separating module for arranging the screws into an array to facilitate the separation of the screws one by one by the automatic separating module.

* * * * *